United States Patent
Yamazaki

(10) Patent No.: US 9,578,666 B2
(45) Date of Patent: Feb. 21, 2017

(54) USER TERMINAL FOR D2D COMMUNICATION USING UPLINK RADIO RESOURCE

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/431,701

(22) PCT Filed: Sep. 25, 2013

(86) PCT No.: PCT/JP2013/075909
§ 371 (c)(1),
(2) Date: Mar. 26, 2015

(87) PCT Pub. No.: WO2014/050887
PCT Pub. Date: Apr. 3, 2014

(65) Prior Publication Data
US 2015/0245395 A1    Aug. 27, 2015

Related U.S. Application Data

(60) Provisional application No. 61/706,340, filed on Sep. 27, 2012.

(51) Int. Cl.
*H04W 4/00* (2009.01)
*H04W 76/02* (2009.01)
(Continued)

(52) U.S. Cl.
CPC ......... *H04W 76/023* (2013.01); *H04W 72/042* (2013.01); *H04W 72/048* (2013.01);
(Continued)

(58) Field of Classification Search
CPC .................... H04W 36/0016; H04W 36/22
(Continued)

(56) References Cited

U.S. PATENT DOCUMENTS

| 9,319,955 B2* | 4/2016 | Kim ...................... H04W 36/22 |
| 2013/0203455 A1 | 8/2013 | Takano |
| 2014/0226629 A1* | 8/2014 | Kim .................. H04W 36/0016 370/331 |

FOREIGN PATENT DOCUMENTS

| EP | 2866366 A1 | 4/2015 |
| EP | 2879462 A1 | 6/2015 |

(Continued)

OTHER PUBLICATIONS

An Office Action issued by the Japanese Patent Office on Oct. 6, 2015, which corresponds to Japanese Patent Application No. 2014-538529 and is related to U.S. Appl. No. 14/431,701; with concise statement of relevance.

(Continued)

*Primary Examiner* — William D Cumming
(74) *Attorney, Agent, or Firm* — Studebaker & Brackett PC

(57) ABSTRACT

A mobile communication system according to embodiment comprises: a user terminal that performs D2D communication that is direct device to device communication; and a base station that performs cellular communication with the user terminal. The D2D communication is performed by using a part of uplink radio resources of the cellular communication. The base station transmits, to the user terminal, a timing advance value that is used for adjustment of a transmission timing in an uplink of the cellular communication. The timing advance value is commonly applied to the adjustment of the transmission timing in the uplink, and adjustment of a transmission timing in the D2D communication.

7 Claims, 10 Drawing Sheets

(51) Int. Cl.
*H04W 72/04* (2009.01)
*H04W 92/18* (2009.01)
*H04W 88/06* (2009.01)
*H04W 88/10* (2009.01)

(52) U.S. Cl.
CPC ........ *H04W 72/0446* (2013.01); *H04W 88/06* (2013.01); *H04W 88/10* (2013.01); *H04W 92/18* (2013.01)

(58) Field of Classification Search
USPC .......................................................... 370/331
See application file for complete search history.

(56) References Cited

FOREIGN PATENT DOCUMENTS

| | | |
|---|---|---|
| JP | 2012-124603 A | 6/2012 |
| WO | 2011/138495 A1 | 11/2011 |
| WO | 2012/118448 A1 | 9/2012 |
| WO | 2012/118451 A1 | 9/2012 |

OTHER PUBLICATIONS

International Search Report; PCT/JP2013/075909; Oct. 22, 2013.
3GPP TR 22.803 V0.3.0 (May 2012); 3rd Generation Partnership Project; Technical Specification Group SA; Feasibility Study for Proximity Services (ProSe) (Release 12); pp. 1-24.
The extended European search report issued by the European Patent Office on Apr. 18, 2016, which corresponds to European Patent Application No. 13841621.9-1855 and is related to U.S. Appl. No. 14/431,701.

* cited by examiner

FIG. 9

| PUCCH | PUCCH | PUCCH | PUCCH | PUCCH | PUCCH | PUCCH | PUCCH | PUCCH | PUCCH |
|---|---|---|---|---|---|---|---|---|---|
| PUSCH | PUSCH | PUSCH | PUSCH | PUSCH | PUSCH | PUSCH | PUSCH | PUSCH | PUSCH |
| | D2D/Tx | D2D/Rx | | | | | | | |
| | PUSCH | PUSCH | | | | | | | |
| PUCCH | PUCCH | PUCCH | PUCCH | PUCCH | PUCCH | PUCCH | PUCCH | PUCCH | PUCCH |

0 ... #9

USER TERMINAL FOR D2D COMMUNICATION USING UPLINK RADIO RESOURCE

TECHNICAL FIELD

The present invention relates to a mobile communication system that supports D2D communication, a user terminal and a base station in the mobile communication system, and a processor provided in the same.

BACKGROUND ART

In 3GPP (3rd Generation Partnership Project) which is a project aiming to standardize a mobile communication system, the introduction of Device to Device (D2D) communication is discussed as a new function after Release 12 (see non patent document).

In the D2D communication, a plurality of adjacent user terminals perform direct communication in a frequency band assigned to a mobile communication system. It is noted that the D2D communication is also called proximity service (Proximity Service) communication.

PRIOR ART DOCUMENT

Non-Patent Document

Non Patent Document 1: 3GPP technical report "TR 22.803 V0.3.0" May 2012

SUMMARY OF THE INVENTION

However, at present, since there are no specifications for appropriately controlling the D2D communication, it is difficult to allow the D2D communication to coexist with cellular communication (communication between a network and a user terminal).

Therefore, the present invention provides a mobile communication system, a user terminal, a base station, and a processor, by which it is possible to appropriately control D2D communication.

A mobile communication system according to embodiment comprises: a user terminal that performs D2D communication that is direct device to device communication; and a base station that performs cellular communication with the user terminal. The D2D communication is performed by using a part of uplink radio resources of the cellular communication. The base station transmits, to the user terminal, a timing advance value that is used for adjustment of a transmission timing in an uplink of the cellular communication. The timing advance value is commonly applied to the adjustment of the transmission timing in the uplink, and adjustment of a transmission timing in the D2D communication.

BRIEF DESCRIPTION OF THE DRAWINGS

FIG. 9 is a diagram for illustrating a detailed example when D2D scheduling is performed at the initiative of eNB.

DESCRIPTION OF THE EMBODIMENT

[Overview of Embodiment]

Figure 1:
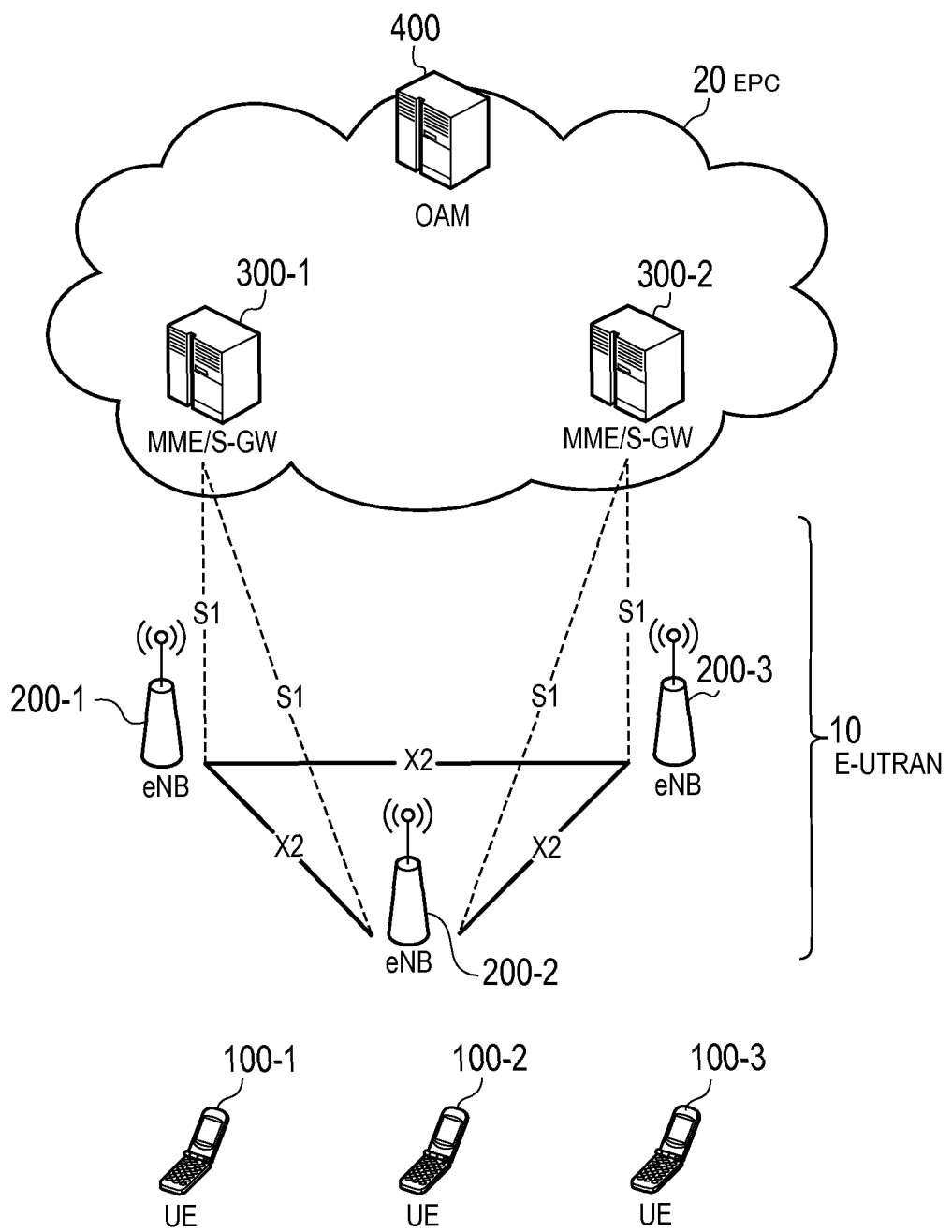
FIG. 1 is a configuration diagram illustrating an LTE system.

A mobile communication system according to an embodiment includes a user terminal that performs D2D communication that is direct device to device communication, and a base station that performs cellular communication with the user terminal. The D2D communication is performed by using a part of uplink radio resources of the cellular communication. The base station transmits, to the user terminal, a timing advance value that is used for the adjustment of a transmission timing in an uplink of the cellular communication. The timing advance value is commonly applied to the adjustment of the transmission timing in the uplink, and the adjustment of a transmission timing in the D2D communication. In this way, the timing advance value that is used for the adjustment of the transmission timing in the uplink of the cellular communication is able to be utilized for the adjustment of the transmission timing in the D2D communication, so that it is possible to reduce a processing load and save a radio resource as compared with the case in which new signaling for the D2D communication is added. Consequently, it is possible to allow the D2D communication to coexist with the cellular communication.

In the embodiment, the user terminal matches the transmission timing in the D2D communication with the transmission timing in the uplink that is determined on the basis of the timing advance value. In this way, when the same user terminal performs simultaneous transmission of the cellular communication and the D2D communication, it is possible to maximally suppress a processing load.

In the embodiment, the timing advance value is commonly applied to the user terminal and another user terminal that performs the D2D communication with the user terminal. As described above, by using a characteristic that user terminals during the D2D communication are adjacent to each other, a common timing advance value is applied to each user terminal during the D2D communication. Consequently, it is possible to reduce a processing load as compared with the case in which an individual timing advance value is applied to each user terminal.

In the embodiment, the base station simultaneously transmits the timing advance value to the user terminal and the other user terminal. That is, the base station simultaneously transmits the same timing advance value to each user terminal during the D2D communication. Consequently, it is possible to save a radio resource as compared with the case in which a timing advance value is individually transmitted to each user terminal.

In a modification of the embodiment, the user terminal transfers the timing advance value from the base station to the other user terminal. That is, one of user terminals during the D2D communication transfers the timing advance value from the base station to the other user terminal. Consequently, it is possible to save a radio resource between the base station and the user terminal.

In the embodiment, each of the user terminal and the other user terminal matches the transmission timing in the D2D communication with the transmission timing in the uplink that is determined on the basis of the timing advance value. In this way, it is not necessary to apply timing synchronization (synchronization of a transmission timing) of user terminals that perform the D2D communication. Consequently, it is possible to reduce a processing load, and to achieve the timing synchronization (the synchronization of the transmission timing) while saving a radio resource.

In the embodiment, each of the user terminal and the other user terminal matches a reception timing in the D2D communication with the transmission timing in the uplink that is determined on the basis of the timing advance value. In this way, it is not necessary to apply timing synchronization (synchronization of a reception timing) of user terminals that perform the D2D communication. Consequently, it is possible to reduce a processing load, and to achieve the timing synchronization (the synchronization of the reception timing) while saving a radio resource.

In the embodiment, the user terminal adjusts the transmission timing in the D2D communication by using the timing advance value.

In another embodiment, the user terminal adjusts the transmission timing in the D2D communication by using, in addition to the timing advance value, a correction value for correcting a timing difference between a transmission timing of the user terminal in the D2D communication and a reception timing, in the D2D communication, of another user terminal that performs the D2D communication with the user terminal.

A user terminal according to the embodiment performs the D2D communication that is direct device to device communication and performs cellular communication with abase station. The D2D communication is performed by using a part of uplink radio resources of the cellular communication. The user terminal includes a control unit that commonly applies a timing advance value to the adjustment of a transmission timing in an uplink of the cellular communication and the adjustment of a transmission timing in the D2D communication when the timing advance value is received from the base station, wherein the timing advance value is used for the adjustment of the transmission timing in the uplink.

A base station according to the embodiment performs the cellular communication with a user terminal that performs the D2D communication that is direct device to device communication. The D2D communication is performed by using a part of uplink radio resources of the cellular communication. The base station includes a control unit that commonly applies a timing advance value to the user terminal and another user terminal that performs the D2D communication with the user terminal, wherein the timing advance value is used for the adjustment of a transmission timing in an uplink of the cellular communication.

A processor according to the embodiment is provided in a user terminal that performs the D2D communication that is direct device to device communication and performs cellular communication with a base station. The D2D communication is performed by using apart of uplink radio resources of the cellular communication. The processor performs a process of commonly applying a timing advance value to the adjustment of a transmission timing in an uplink of the cellular communication and the adjustment of a transmission timing in the D2D communication when the user terminal receives the timing advance value from the base station, wherein the timing advance value is used for the adjustment of the transmission timing in the uplink.

A processor according to the embodiment is provided in a base station that performs the cellular communication with a user terminal that performs the D2D communication that is direct device to device communication. The D2D communication is performed by using a part of uplink radio resources of the cellular communication. The processor performs a process of commonly applying a timing advance value to the user terminal and another user terminal that performs the D2D communication with the user terminal, wherein the timing advance value is used for the adjustment of a transmission timing in the uplink of the cellular communication.

[Embodiment]

Hereinafter, with reference to the accompanying drawings, description will be provided for an embodiment in which D2D communication is introduced to a mobile communication system (an LTE system) configured based on 3GPP standards.

(LTE System)

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
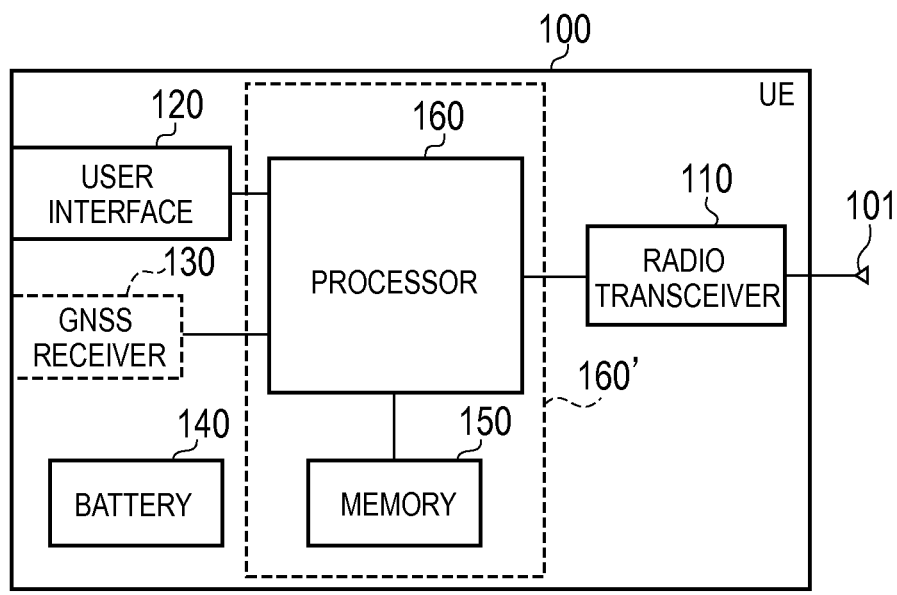
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
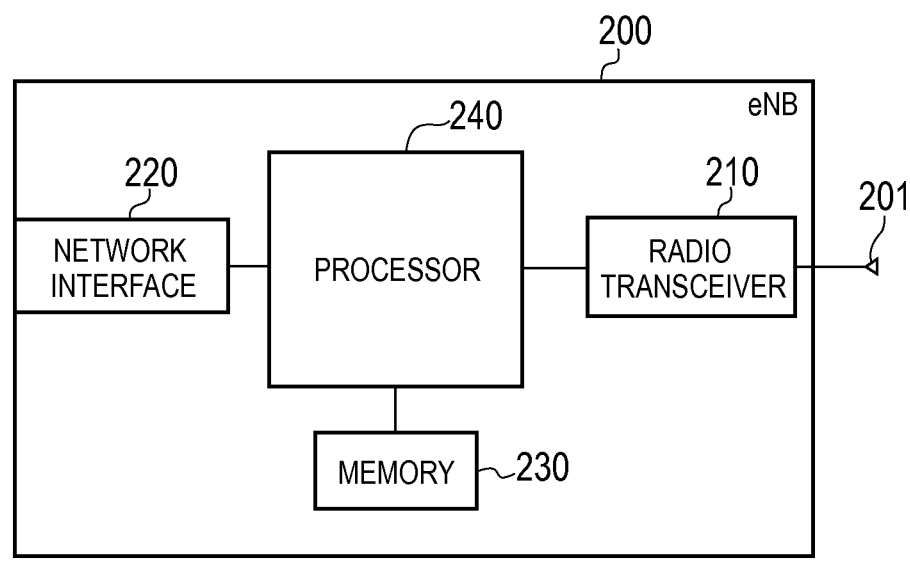
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Furthermore, the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
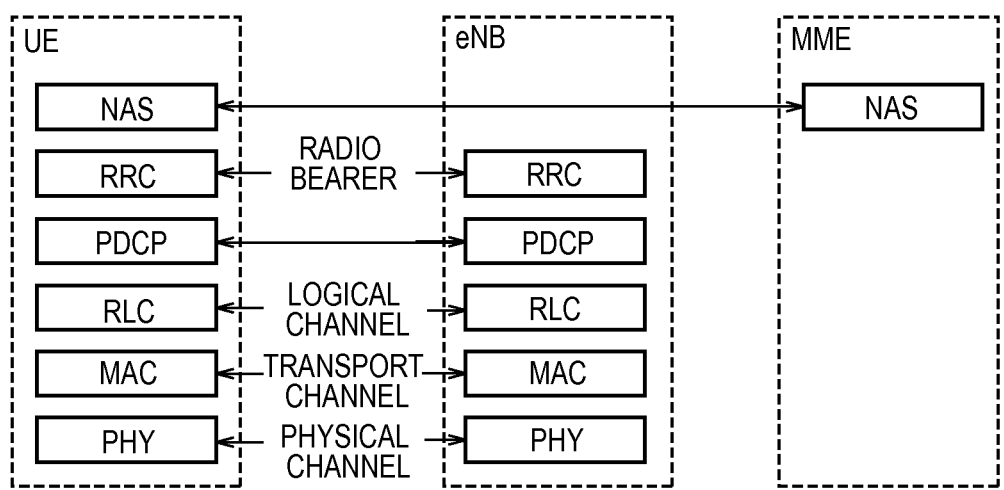
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes MAC scheduler that determines an uplink and downlink transport format (a transport block size, a modulation and coding scheme, and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
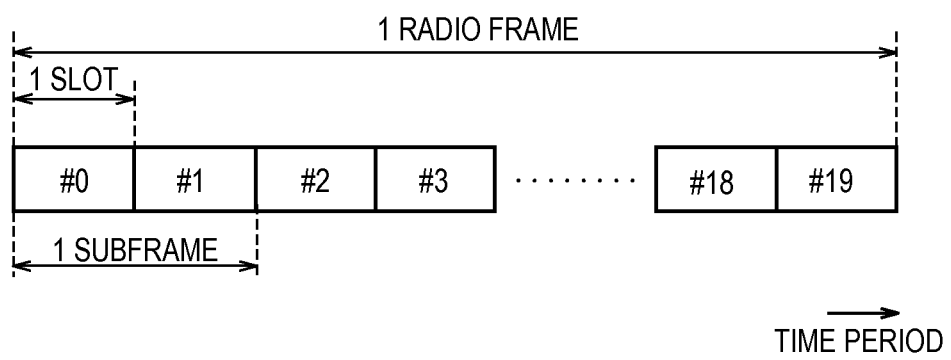
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively. As a duplex scheme, one of a FDD (Frequency Division Duplex) scheme and a TDD (Time Division Duplex) scheme is applied. However, in the present embodiment, the FDD scheme is mainly considered.

As illustrated in FIG. 5, the radio frame is configured by 10 subframes arranged in a time direction, wherein each subframe is configured by two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time-period resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSS) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged.

(Timing Advance)

Figure 6:
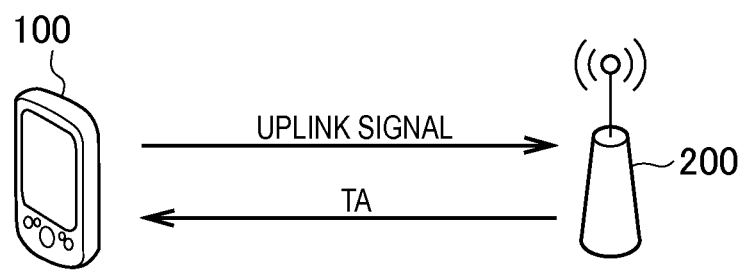
FIG. 6 is a diagram for illustrating the overview of TA (a timing advance value).

Next, the overview of a timing advance value (hereinafter, "TA") will be described. Details of the TA according to the present embodiment will be described later. Hereinafter, general TA will be described. FIG. 6 is a diagram for explaining the overview of the TA.

As illustrated in FIG. 6, the TA is used for the adjustment of a transmission timing in an uplink. In the uplink, the UE 100 remote from eNB 200 needs to advance a transmission timing so as to match with a reception timing of the eNB 200 in consideration of propagation delay. Therefore, the eNB 200 measures a reception timing of an uplink signal from the UE 100, calculates TA for adjusting a transmission timing of UE, and transmits the calculated TA to the UE 100.

For example, as the TA, immediate data (an initial value) is used at the time of initial transmission, and a difference value is used after the second time. Alternatively, as the TA, the difference value may also be used at the time of initial transmission. Specifically, in a random access procedure (an RACH procedure), the UE 100 transmits an uplink signal according to a downlink timing from the eNB 200, and the eNB 200 calculates TA (a difference value) and notifies the UE 100 of the TA so as to adjust an uplink transmission timing of the UE 100.

Furthermore, the TA is transmitted and received at a MAC layer. Specifically, the TA is transmitted from the eNB 200 to the UE 100 as TA MCE (Timing Advance Command Mac Control Element).

In the situation in which the UE 100 approaches the eNB 200, in order to delay the transmission timing of the UE 100, the eNB 200 calculates a negative value as the TA with respect to a current transmission timing of the UE 100, and transmits the calculated TA to the UE 100. When the TA is received, the UE 100 delays the transmission timing according to the received TA.

On the other hand, in the situation in which the UE 100 gets away from the eNB 200, in order to advance the transmission timing of the UE 100, the eNB 200 calculates a positive value as the TA with respect to the current transmission timing of the UE 100, and transmits the calculated TA to the UE 100. When the TA is received, the UE 100 advances the transmission timing according to the received TA.

(D2D Communication)

The LTE system according to the present embodiment supports the D2D communication. Hereinafter, the D2D communication will be described in comparison with normal communication (cellular communication) of the LTE system. In the cellular communication, data communication is performed between the network (the eNB 200) and the UE 100. On the other hand, in the D2D communication, data communication is directly performed among two or more UEs 100.

Figure 7:
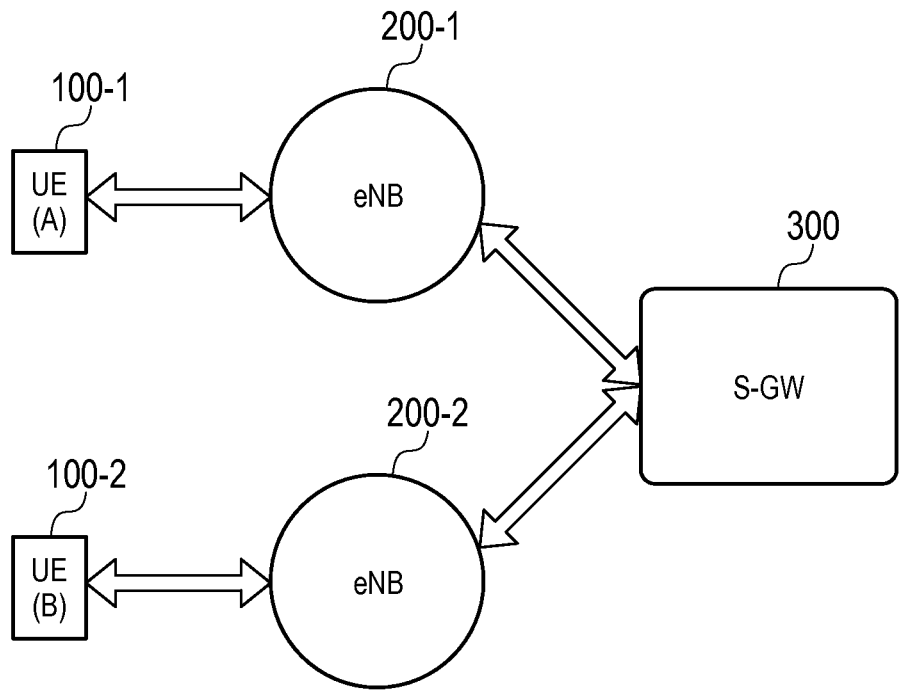
FIG. 7 is a diagram for illustrating a data path in cellular communication.

FIG. 7 illustrates a data path in the cellular communication. FIG. 7 illustrates the case in which the cellular communication is performed between UE 100-1 that establishes a connection with eNB 200-1 and UE 100-2 that establishes a connection with eNB 200-2. In addition, the data path indicates a transfer path of user data (a user plane).

As illustrated in FIG. 7, the data path of the cellular communication passes through the network. Specifically, the data path is set to pass through the eNB 200-1, the S-GW 300, and the eNB 200-2.

Figure 8:
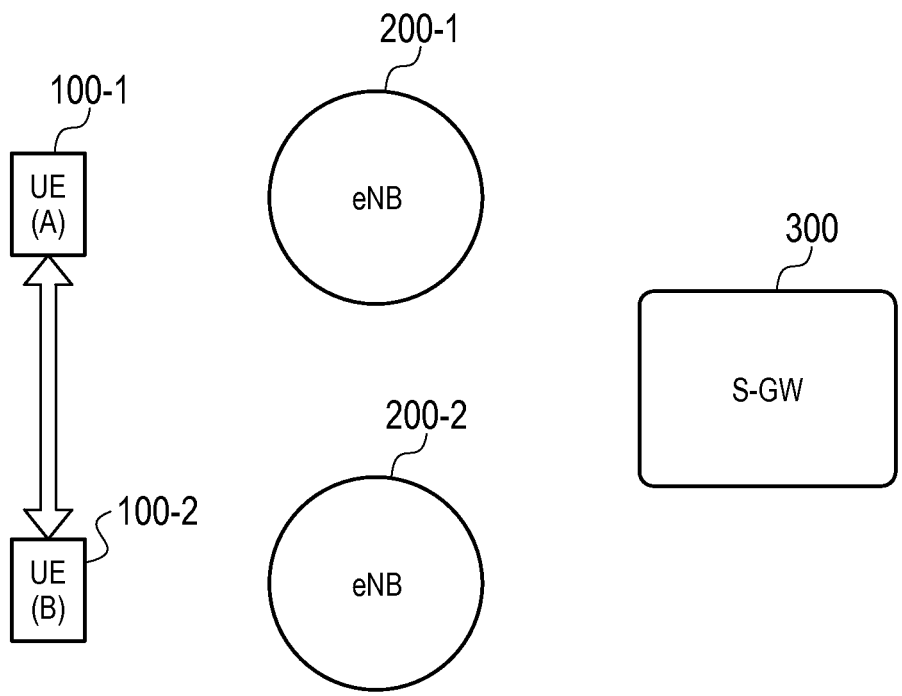
FIG. 8 is a diagram for illustrating a data path in D2D communication.

FIG. 8 illustrates a data path in the D2D communication. In this case, FIG. 8 illustrates the case in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Furthermore, the UE 100 has a (Discoverable) function discovered by the other UE 100.

As illustrated in FIG. 8, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example.

Furthermore, the D2D communication is considered to be performed in a frequency band (that is, in a frequency band of the cellular communication) of the LTE system, and for example, in order to avoid interference to the cellular communication, the D2D communication is performed under the control of the network (the eNB 200).

In the present embodiment, the D2D communication is performed in an uplink frequency band (that is, in an uplink frequency band of the cellular communication) of the LTE system. In other words, the D2D communication is performed by using a part of uplink radio resources of the cellular communication.

Furthermore, in the present embodiment, D2D scheduling, which is radio resource assignment for the D2D communication, is performed at the initiative of the eNB 200. In this case, the eNB 200 determines a D2D radio resource that is a radio resource to be assigned to the D2D communication. That is, the UE 100 has no selection right of the D2D radio resource. The eNB 200 notifies the UE 100 of the D2D radio resource assigned dynamically or semi-persistently. The UE 100 performs the D2D communication by using the assigned D2D radio resource. In addition, details thereof will be described later. However, the D2D scheduling may be performed at the initiative of the UE 100.

FIG. 9 is a diagram for explaining a detailed example when the D2D scheduling is performed at the initiative of the eNB.

As illustrated in FIG. 9, the eNB 200 designates a specific resource block of a specific subframe as the D2D radio resource. In the example of FIG. 9, a part of resource blocks in a second subframe (a subframe #1) and a part of resource blocks in a fourth subframe (a subframe #3) of a radio frame are designated as the D2D radio resource.

The UE 100 performing the D2D communication performs the D2D communication by using the D2D radio resource assigned from the eNB 200.

In addition, transmission (Tx) in the second subframe (the subframe #1) indicates that one UE 100 transmits in the D2D communication and another UE 100 receives in the D2D communication. Reception (Rx) in the fourth subframe (the subframe #3) indicates that one UE 100 receives in the D2D communication and another UE 100 transmits in the D2D communication.

(Operation According to Embodiment)

Figure 10:
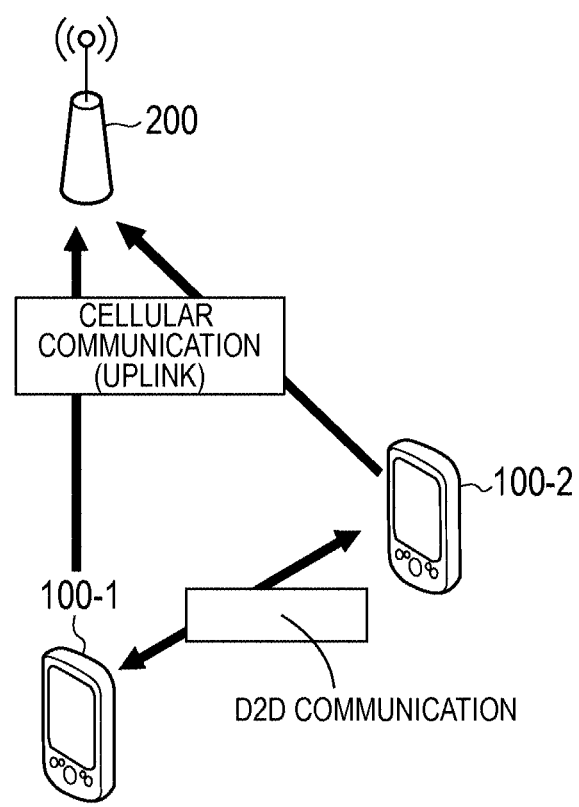
FIG. 10 is a diagram for illustrating a communication environment according to an embodiment.

Next, an operation according to the present embodiment will be described. FIG. 10 is a diagram for explaining a communication environment according to the present embodiment. The present embodiment considers a communication environment in which the same UE 100 simultaneously performs the cellular communication and the D2D communication.

As illustrated in FIG. 10, UE 100-1 and UE 100-2 perform the D2D communication by using the D2D radio resource assigned from the eNB 200.

Moreover, each of the UE 100-1 and the UE 100-2 performs the cellular communication by using a cellular radio resource that is assigned from the eNB 200. Specifically, each of the UE 100-1 and the UE 100-2 performs uplink communication with the eNB 200 by using an uplink radio resource that is assigned from the eNB 200.

The eNB 200 transmits, to the UE 100-1 and the UE 100-2, TA that is used for the adjustment of a transmission timing (an uplink transmission timing) in an uplink. The TA is commonly applied to the adjustment of the uplink transmission timing and the adjustment of a transmission timing (a D2D transmission timing) in the D2D communication. That is, the TA, which is used for the adjustment of the uplink transmission timing, is utilized for the adjustment of the D2D transmission timing. Hereinafter, such TA is called "common TA".

Furthermore, it is possible to regard that UEs 100 during the D2D communication are adjacent to each other and distances (distances between UEs and eNB) between the UEs 100 during the D2D communication and the eNB 200 are equivalent to each other. Consequently, the common TA is commonly applied to the UE 100-1 and the UE 100-2 that performs the D2D communication with the UE 100-1.

In the present embodiment, the eNB 200 simultaneously transmits the common TA to the UE 100-1 and the UE 100-2. For example, the eNB 200 simultaneously transmits the common TA to the UE 100-1 and the UE 100-2 by using a radio network temporary identifier (D2D-RNTI) dedicated for the D2D communication. In this case, the eNB 200 may transmit the common TA on the PDCCH or the PDSCH. In addition, the D2D-RNTI is RNTI that is common to a UE group (the UE 100-1 and the UE 100-2) that performs the D2D communication.

Each of the UE 100-1 and the UE 100-2 matches the D2D transmission timing with an uplink transmission timing that is determined on the basis of the common TA. Furthermore, even though there is no data to be transmitted in the uplink, if there is data to be transmitted through the D2D communication, each of the UE 100-1 and the UE 100-2 matches the D2D transmission timing with the uplink transmission timing.

In the example of FIG. 9, when considering the case in which the UE 100-1 performs D2D transmission and uplink transmission in the second subframe (the subframe #1), the UE 100-1 simultaneously performs the D2D transmission and the uplink transmission at a timing based on the common TA.

Furthermore, the UEs 100 during the D2D communication are adjacent to each other and propagation delay between the UEs 100 during the D2D communication is ignorable. Furthermore, in the present embodiment, in the D2D communication, since a transmission side matches a transmission timing with the uplink transmission timing, it is sufficient if a reception side matches a reception timing with its own uplink transmission timing.

Consequently, each of the UE 100-1 and the UE 100-2 matches a reception timing (a D2D reception timing) in the D2D communication with an uplink transmission timing that is determined on the basis of the TA. Furthermore, even though there is no data to be transmitted in the uplink, if there is data to be received through the D2D communication, each of the UE 100-1 and the UE 100-2 matches the D2D reception timing with the uplink transmission timing.

In the example of FIG. 9, when considering the case in which the UE 100-1 performs D2D reception and uplink transmission in the fourth subframe (the subframe #3), the UE 100-1 simultaneously performs the D2D reception and the uplink transmission at a timing based on the common TA.

Figure 11:
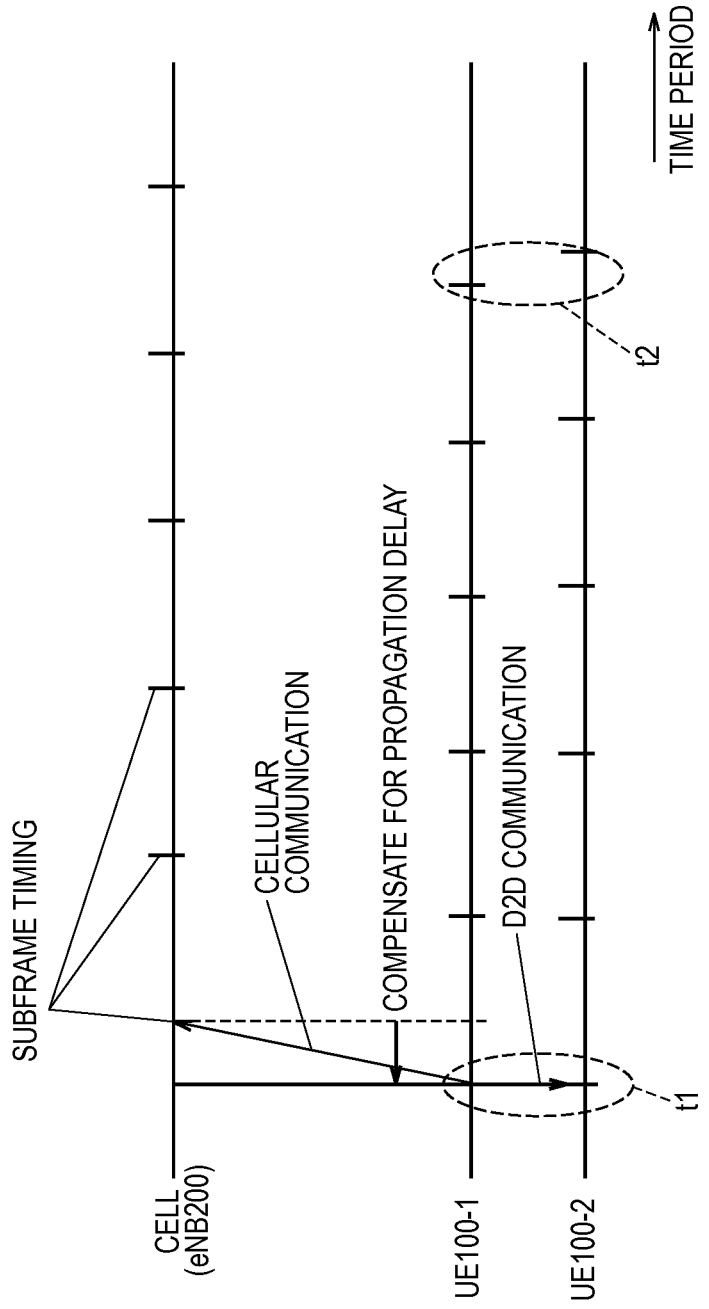
FIG. 11 is a time chart for illustrating a detailed operation example according to the embodiment.

Next, a detailed operation example according to the present embodiment will be described. FIG. 11 is a time chart for explaining a detailed operation example according to the present embodiment.

As illustrated in FIG. 11, at a time t1, the common TA is applied to the UE 100-1 and the UE 100-2. Consequently, at the time t1, each of the UE 100-1 and the UE 100-2 sets the same timing as the uplink transmission timing on the basis of the common TA. In the example of FIG. 11, each of the UE 100-1 and the UE 100-2 sets the uplink transmission timing as a timing prior to a subframe timing of a cell of the eNB 200.

Then, the situation, in which the UE 100-1 is stationary but the UE 100-2 approaches the eNB 200, is considered. At a time t2, the eNB 200 detects that the difference between TA to be applied to the UE 100-1 and TA to be applied to the UE 100-2 exceeds an allowable range. Specifically, the eNB 200 detects that a reception available range of the eNB 200 is exceeded if the common TA is applied. In this case, the eNB 200 may regard that it is not suitable for the D2D communication, and release the D2D communication by the UE 100-1 and the UE 100-2.

Figure 12:
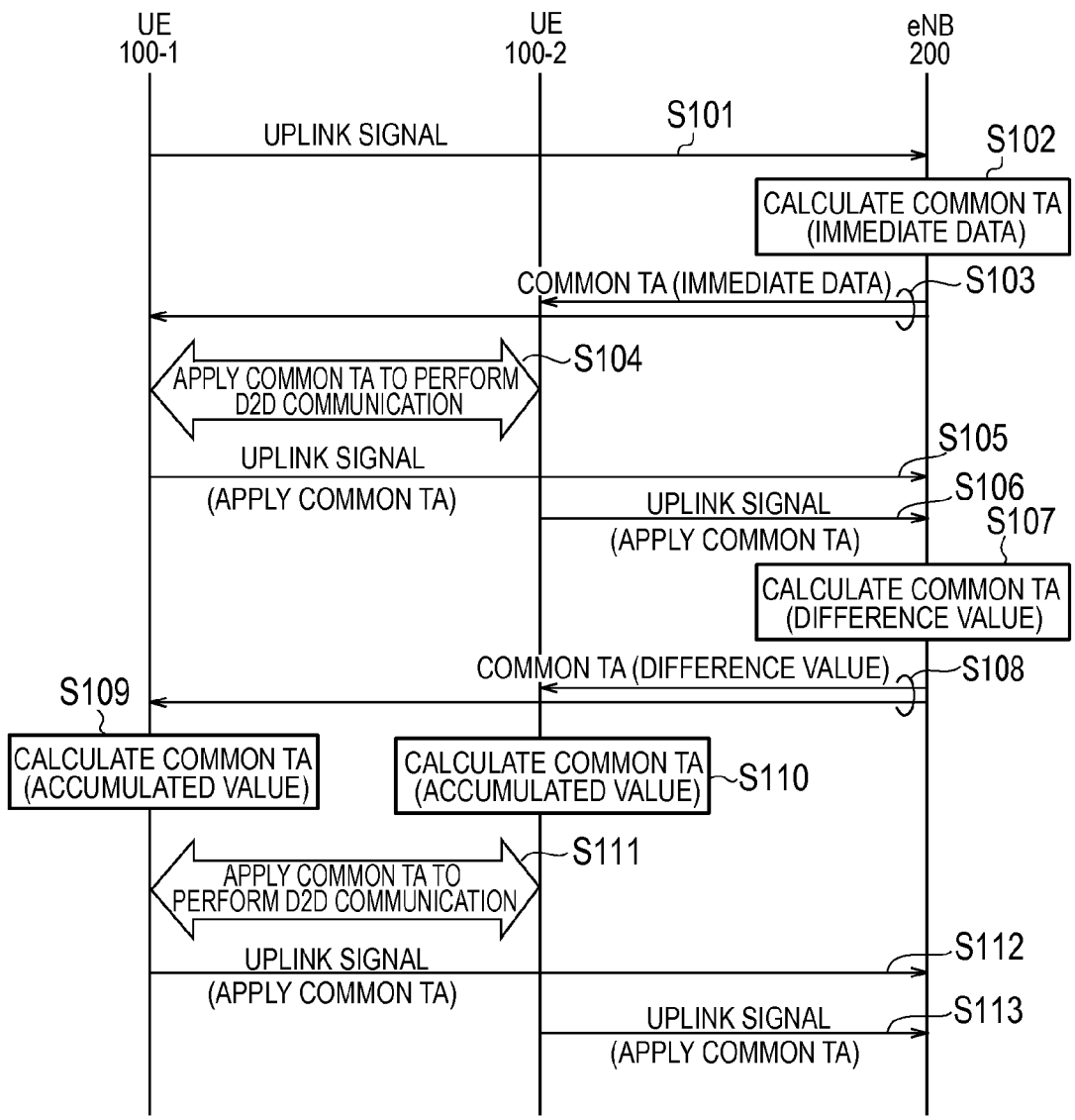
FIG. 12 is an operation sequence diagram according to the embodiment.

Next, an example of an operation sequence according to the present embodiment will be described. FIG. 12 is an operation sequence diagram according to the present embodiment. In an initial state of the present sequence, the UE 100-1 and the UE 100-2 start the D2D communication under the control of the eNB 200.

As illustrated in FIG. 12, in step S101, the UE 100-1 transmits an uplink signal to the eNB 200.

In step S102, the eNB 200 calculates common TA on the basis of the uplink signal received from the UE 100-1. For example, the eNB 200 calculates the common TA so as to compensate for the timing difference between the subframe timing of its own cell and the reception timing of the uplink signal from the UE 100-1. The calculated common TA is immediate data (an initial value). Alternatively, as described above, in the random access procedure (the RACE procedure), the UE 100-1 may transmit the uplink signal according to the downlink timing from the eNB 200, and the eNB 200 may calculate TA (a difference value) and notify the UE 100-1 of the TA so as to adjust an uplink transmission timing of the UE 100-1.

In step S103, the eNB 200 simultaneously transmits the common TA calculated in step S102 to the UE 100-1 and the UE 100-2. For example, the eNB 200 simultaneously transmits the common TA to the UE 100-1 and the UE 100-2 by using D2D-RNTI.

In step S104, each of the UE 100-1 and the UE 100-2 performs the D2D communication by applying the common TA received from the eNB 200 in step S103. Specifically, each of the UE 100-1 and the UE 100-2 matches a D2D transmission timing with an uplink transmission timing that is determined on the basis of the common TA. Furthermore, each of the UE 100-1 and the UE 100-2 matches a D2D reception timing with the uplink transmission timing that is determined on the basis of the common TA.

In step S105, the UE 100-1 transmits an uplink signal to the eNB 200 by applying the common TA received from the eNB 200 in step S103. Specifically, the UE 100-1 transmits the uplink signal to the eNB 200 at the uplink transmission timing that is determined on the basis of the common TA.

In step S106, the UE 100-2 transmits an uplink signal to the eNB 200 by applying the common TA received from the eNB 200 in step S103. Specifically, the UE 100-2 transmits the uplink signal to the eNB 200 at the uplink transmission timing that is determined on the basis of the common TA.

In step S107, the eNB 200 calculates common TA on the basis of the uplink signals received from each of the UE 100-1 and the UE 100-2. For example, the eNB 200 calculates the common TA so as to compensate for the timing difference between the subframe timing of its own cell and the reception timing of the uplink signal from the UE 100-1. The calculated common TA is a difference value from the common TA of the previous time. In addition, when the eNB 200 detects that a reception available range is exceeded if the common TA is applied, the eNB 200 may release the D2D communication by the UE 100-1 and the UE 100-2.

In step S108, the eNB 200 simultaneously transmits the common TA calculated in step S107 to the UE 100-1 and the UE 100-2. For example, the eNB 200 simultaneously transmits the common TA to the UE 100-1 and the UE 100-2 by using D2D-RNTI.

In step S109, the UE 100-1 accumulates the common TA (the difference value), which was received from the eNB 200 in step S107, in the common TA of the previous time, thereby calculates common TA (an accumulated value). In the same manner, in step S110, the UE 100-2 accumulates the common TA (the difference value), which was received from the eNB 200 in step S107, in the common TA of the previous time, thereby calculates common TA (an accumulated value).

In step S111, the UE 100-1 performs the D2D communication by applying the common TA (the accumulated value) calculated in step S109. Furthermore, the UE 100-1 performs the D2D communication by applying the common TA (the accumulated value) calculated in step S110. Specifically, each of the UE 100-1 and the UE 100-2 matches a D2D transmission timing with an uplink transmission timing that is determined on the basis of the common TA. Furthermore, each of the UE 100-1 and the UE 100-2 matches a D2D reception timing with the uplink transmission timing that is determined on the basis of the common TA.

In step S112, the UE 100-1 transmits an uplink signal to the eNB 200 by applying the common TA (the accumulated value) calculated in step S109. Furthermore, in step S113, the UE 100-2 transmits an uplink signal to the eNB 200 by applying the common TA (the accumulated value) calculated in step S110. Then, the procedure in step S107 to step S113 is repeated.

Consequently, according to the present embodiment, it is possible to reduce a processing load, and to allow the D2D communication to appropriately coexist with the cellular communication while saving a radio resource.

[Modification of Embodiment]

In the aforementioned embodiment, the eNB 200 simultaneously transmits the common TA to the UE group (the UE 100-1 and the UE 100-2) that performs the D2D communication.

On the other hand, in the present modification, the eNB 200 transmits the common TA to one UE 100 (for example, the UE 100-1) of the UE group that performs the D2D communication, and the one UE 100 transfers the common TA to the other UE 100.

Figure 13:
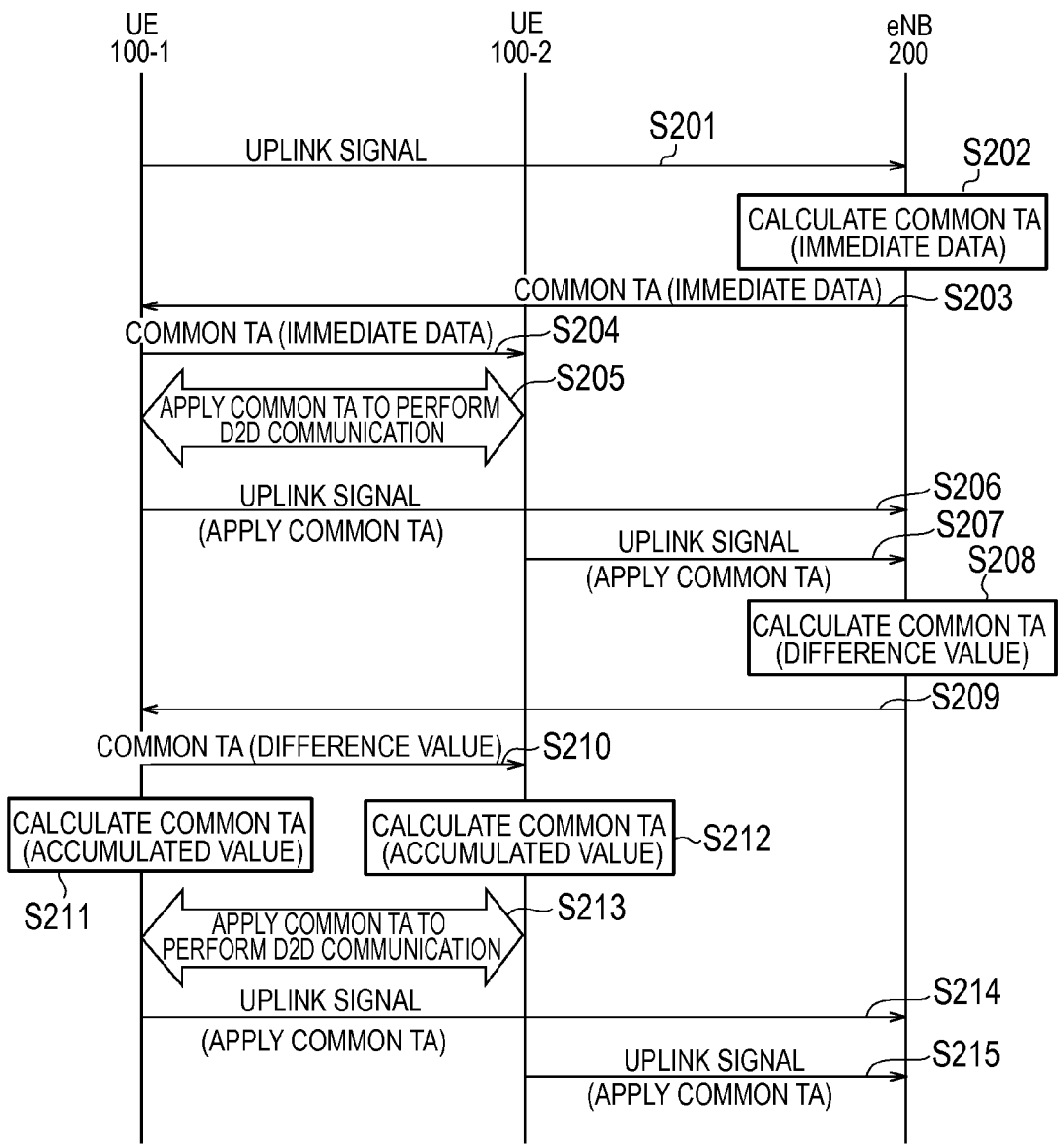
FIG. 13 is an operation sequence diagram according to a modification of the embodiment.

FIG. 13 is an operation sequence diagram according to the present modification. Hereinafter, differences from the aforementioned embodiment will be described.

As illustrated in FIG. 13, steps S201 and S202 are the same as those of the aforementioned embodiment.

In step S203, the eNB 200 transmits the common TA (the immediate data) calculated in step S202 to the UE 100-1. However, the common TA is not limited to the immediate data. For example, the common TA may be a difference value.

In step S204, the UE 100-1 transfers the common TA received from the eNB 200 in step S203 to the UE 100-2.

Steps S205 to S208 are the same as those of the aforementioned embodiment.

In step S209, the eNB 200 transmits the common TA (the difference value) calculated in step S208 to the UE 100-1. In step S210, the UE 100-1 transfers the common TA received from the eNB 200 in step S209 to the UE 100-2.

Steps S211 to S215 are the same as those of the aforementioned embodiment.

[Other Embodiments]

Thus, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

In the operation sequences according to the aforementioned embodiment and the modification thereof, the case, in which the common TA is applied with using the initial transmission time of TA as immediate data, is mainly described. However, since it is probable that the immediate data itself is not common to D2D terminals due to the influence and the like of operation delay inside the UE 100, the common TA may also be applied only to the difference value.

In the aforementioned embodiment and the modification, the UEs 100 (the UE 100-1 and the UE 100-2) match a transmission timing in the D2D communication with an uplink transmission timing that is determined on the basis of the common TA. That is, the UEs 100 adjust the transmission timing in the D2D communication by using the common TA. However, in addition thereto, it is possible to adjust the transmission timing in the D2D communication in other ways.

For example, in addition to the common TA, the UE 100 (for example, the UE 100-1) may adjust the transmission timing in the D2D communication by using a correction value for correcting a timing difference between the transmission timing of the UE 100 in the D2D communication and the reception timing of another UE 100 (for example, the UE 100-2), in the D2D communication, that performs the D2D communication with the UE 100.

Here, the correction value may be calculated from a difference between the reception timing at which the UE 100-2 receives a signal (for example, a reference signal for D2D communication) transmitted by the UE 100-1 and a reception timing desired by the UE 100-2, or may be a predetermined offset value (fixed value). Further, the UE 100 may previously hold the correction value, may calculate the correction value as in the above, or may receive the correction value from the eNB 200. When transmitting the correction value to the UE 100, the eNB 200 may transmit the correction value and the common TA to the UE 100. Further, the eNB 200 may transmit the correction value to the UE 100 in response to a request from the UE 100.

The UE 100 may determine the transmission timing by a value obtained by correcting the common TA with the correction value in order to correct a timing difference between the D2D terminals, or as in the above-mentioned embodiment and modification, the UE 100 may determine the transmission timing by the common TA only when the timing difference between the D2D terminals is ignorable.

In the aforementioned embodiment and the modification, the UEs 100 (the UE 100-1 and the UE 100-2) match a reception timing in the D2D communication with an uplink transmission timing that is determined on the basis of the common TA. That is, the UEs 100 adjust the reception timing in the D2D communication by using the common TA. However, it is possible to adjust the reception timing in the D2D communication in other ways.

For example, the UE 100 may adjust the reception timing in the D2D communication by using the TA of the UE 100 transmitted from the eNB 200 (that is, not the common TA but TA evaluated by the reception timing, actually measured by the eNB 200, of the uplink signal from the UE 100). That is, the UE 100 may match the reception timing in the D2D communication with the transmission timing in the uplink that is determined on the basis of the TA of the UE 100 transmitted from the eNB 200. Further, the UE 100 may adjust the reception timing in the D2D communication by using the synchronization signal from the eNB 200. That is, the UE 100 may match the reception timing in the D2D communication with the reception timing in the downlink that is determined on the basis of the synchronization signal from the eNB 200. Alternatively, the UE 100 may adjust the reception timing in the D2D communication by using a correction value (for example, a predetermined offset value) for correcting the timing that is determined on the basis of the TA of the UE 100 transmitted from the eNB 200 or the timing that is determined on the basis of the synchronization signal from the eNB 200.

It is noted that similarly to the above-described correction value for adjusting the transmission timing, the UE 100 may previously hold the correction value, may calculate the correction value or may receive the correction value from the eNB 200. When transmitting the correction value to the UE 100, the eNB 200 may transmit the correction value and the common TA to the UE 100. Further, the eNB 200 may transmit the correction value to the UE 100 in response to a request from the UE 100.

In the aforementioned embodiment and the modification thereof, the D2D scheduling is performed at the initiative of the eNB 200. However, the D2D scheduling may also be performed at the initiative of the UE 100. In this case, the UE is able to select the D2D radio resource. The eNB 200 transmits, to the UE 100, D2D resource information indicating D2D assignment candidate radio resources that are radio resources available for the D2D communication. If the D2D resource information indicating the D2D assignment candidate radio resources is received from the eNB 200, the UE 100 performing the D2D communication autonomously selects a D2D radio resource (a resource block) from among the D2D assignment candidate radio resources indicated by the D2D resource information.

Furthermore, in the aforementioned embodiment and the modification thereof, the FDD scheme is considered as the duplex scheme. However, the TDD scheme may also be considered.

Further, in the aforementioned embodiments, one example of the present invention is applied to the LTE system is described; however, the present invention is not limited to the LTE system, and the present invention may be applied to a system other than the LTE system.

In addition, the entire content of U.S. Provisional Application No. 61/706,340 (filed on Sep. 27, 2012) is incorporated in the present specification by reference.

INDUSTRIAL APPLICABILITY

As described above, the mobile communication system, a user terminal, a base station and a processor according to the present invention are able to appropriately control D2D communication, and thus is useful for a mobile communication field.

The invention claimed is:

1. A user terminal, which performs D2D communication that is direct device to device communication and performs cellular communication with a base station, comprising:
a processor and a memory coupled to the processor, the processor configured to:
perform the D2D communication by using a part of uplink radio resources of the cellular communication,
receive, from a base station via a transceiver, a timing advance value that is used for adjustment of a transmission timing in an uplink of the cellular communication,
apply, the timing advance value to adjustment of a transmission timing in an uplink of the cellular communication, and
apply commonly, the timing advance value to adjustment of a transmission timing in the D2D communication.

2. An apparatus to be provided in a user terminal which performs D2D communication that is direct device to device communication and performs cellular communication with a base station, comprising:
a processor and a memory coupled to the processor, the processor configured to:
perform the D2D communication by using a part of uplink radio resources of the cellular communication,
receive, from a base station via a transceiver, a timing advance value that is used for adjustment of a transmission timing in an uplink of the cellular communication, apply, the timing advance value to adjustment of a transmission timing in an uplink of the cellular communication, and apply commonly, the timing advance value to adjustment of a transmission timing in the D2D communication.

3. The user terminal according to claim 1, wherein the timing advance value is received from the base station in the absence of a handover procedure.

4. The user terminal according to claim 1, wherein the timing advance value received from the base station is not related to a handover.

5. The user terminal according to claim 1, wherein the timing advance value received from the base station does not cause a handover.

6. The user terminal according to claim 1, wherein the processor is further configured to use a timing as a reception timing in the D2D communication, wherein the timing is generated by correcting, by a predetermined offset value, the adjusted transmission timing in the uplink based on the timing advance value.

7. The user terminal according to claim 1, wherein the processor is further configured to transmit information to another terminal that performs the D2D communication with the user terminal, wherein the information is based on the timing advance value.

* * * * *